United States Patent
Yamada et al.

(10) Patent No.: US 9,112,241 B2
(45) Date of Patent: Aug. 18, 2015

(54) PYROPHOSPHATE COMPOUND AND PRODUCTION PROCESS THEREOF

(75) Inventors: Atsuo Yamada, Bunkyo-ku (JP); Shinichi Nishimura, Bunkyo-ku (JP); Ryuichi Natsui, Yokohami (JP)

(73) Assignee: The University of Tokyo, Tokyo (JP)

( * ) Notice: Subject to any disclaimer, the term of this patent is extended or adjusted under 35 U.S.C. 154(b) by 477 days.

(21) Appl. No.: 13/513,563

(22) PCT Filed: Dec. 3, 2010

(86) PCT No.: PCT/JP2010/072183
§ 371 (c)(1),
(2), (4) Date: Jun. 1, 2012

(87) PCT Pub. No.: WO2011/068255
PCT Pub. Date: Jun. 9, 2011

(65) Prior Publication Data
US 2012/0235082 A1  Sep. 20, 2012

(30) Foreign Application Priority Data
Dec. 4, 2009  (JP) .................................. 2009-276513

(51) Int. Cl.
*C01B 25/42* (2006.01)
*H01M 4/525* (2010.01)
*H01M 10/0525* (2010.01)
*H01M 4/58* (2010.01)

(52) U.S. Cl.
CPC ........... *H01M 10/0525* (2013.01); *C01B 25/42* (2013.01); *H01M 4/5825* (2013.01); *Y02E 60/122* (2013.01)

(58) Field of Classification Search
None
See application file for complete search history.

(56) References Cited

U.S. PATENT DOCUMENTS

| 7,008,566 | B2* | 3/2006 | Barker et al. | 252/518.1 |
| 2004/0206938 | A1* | 10/2004 | Barker et al. | 252/500 |
| 2005/0136331 | A1* | 6/2005 | Jouanneau-Si Larbi et al. | 429/231.95 |
| 2006/0091363 | A1* | 5/2006 | Barker et al. | 252/518.1 |
| 2007/0292747 | A1* | 12/2007 | Chiang et al. | 429/52 |
| 2010/0015514 | A1* | 1/2010 | Miyagi et al. | 429/129 |
| 2010/0297496 | A1* | 11/2010 | Ravet et al. | 429/207 |
| 2011/0020700 | A1* | 1/2011 | Iwaya | 429/200 |

(Continued)

FOREIGN PATENT DOCUMENTS

| JP | 2006-523930 | 10/2006 |
| JP | 2007-214120 | 8/2007 |
| JP | 2009-518262 | 5/2009 |

OTHER PUBLICATIONS

International Search Report, corresponding to PCT/JP2010/072183, dayed Jan. 25, 2011, 3 pages.

(Continued)

*Primary Examiner* — Joseph D Anthony
(74) *Attorney, Agent, or Firm* — Christie, Parker & Hale, LLP

(57) ABSTRACT

To provide a positive electrode active material containing a pyrophosphate compound, ensuring that mixing of impurities is easily prevented to facilitate the synthesis and a high capacity battery is obtained, and a lithium ion battery using the positive electrode material. That is, the present invention relates to a pyrophosphate compound represented by the formula: $Li_2M_{1-x}Fe_xP_2O_7$ (wherein M represents one or more elements selected from Mn, Zr, Mg, Co, Ni, V and Cu, and $0.3 \leq x \leq 0.9$).

8 Claims, 3 Drawing Sheets

(56) References Cited

U.S. PATENT DOCUMENTS

| | | | |
|---|---|---|---|
| 2011/0027663 A1* | 2/2011 | Ohkubo et al. | 429/326 |
| 2011/0129732 A1* | 6/2011 | Bachrach et al. | 429/220 |
| 2012/0107701 A1* | 5/2012 | Iwaya | 429/341 |
| 2012/0235082 A1* | 9/2012 | Yamada et al. | 252/182.1 |
| 2014/0246619 A1* | 9/2014 | Hautier et al. | 252/182.1 |

OTHER PUBLICATIONS

Extended European Search Report for corresponding European Patent Application No. 10834694.1, dated Oct. 24, 2014, 8pp.

Adam, Laure et al.; "A new lithium manganese phosphate with an original tunnel structure in the $A_2MP_2O_2$ family"; Journal of Solid State Chemistry; vol. 181; 2008; pp. 3110-3115.

Boonchom, Banjong et al.; "Synthesis of new binary cobalt iron pyrophosphate $CoFeP_2O_7$"; Materials Letters; vol. 63; 2009; pp. 1709-1711.

Ramana, C. V. et al.; "Novel Lithium Iron Pyrophosphate ($LiFe_{1.5}P_2O_7$) as a Positive Electrode for Li-Ion Batteries"; Chem. Mater.; vol. 19; 2007; pp. 5319-5324.

Uebou, Yasushi et al.; "Electrochemical Alkali Metal Intercalation into the 3D-framework of $MP_2O_7$ (M=MO, W)"; Electrochemistry; vol. 71; May 1, 2003; pp. 308-312.

* cited by examiner

PYROPHOSPHATE COMPOUND AND PRODUCTION PROCESS THEREOF

CROSS-REFERENCE TO RELATED APPLICATION

This application is a National Phase Patent Application and claims the priority of International Application Number PCT/JP2010/072183 filed on Dec. 3, 2010, which claims priority of Japanese Patent Application Number 2009-276513 filed on Dec. 4, 2009.

TECHNICAL FIELD

The present invention relates to a pyrophosphate compound, a production process thereof, and a positive electrode active material using the compound.

BACKGROUND ART

Heretofore, a rechargeable secondary battery has been continuously studied as a battery that is usable economically for a prolonged period of time. In particular, a lithium battery has advantages such as high output and high energy density and is usually composed of positive and negative electrodes each having an active material capable of reversible extraction/insertion of a lithium ion, and a nonaqueous electrolyte.

As the positive electrode active material of such a lithium ion battery, for example, a metal oxide, a metal sulfide or a polymer is used, and known examples include lithium-free compounds such as $TiS_2$, $MoS_2$, $NbSe_2$ and $V_2O_5$, and a lithium composite oxide such as $LiMO_2$ (M=Co, Ni, Mn, Fe or the like) and $LiMn_2O_4$. Among these, a battery fabricated using $LiMn_2O_4$ has a high battery capacity but in consideration of, for example, capacity deterioration during high-temperature storage and dissolution of Mn into the electrolytic solution, there remains a problem that the stability or cycle characteristics are not sufficient.

Also, $LiFePO_4$ has been proposed but does not have sufficiently large capacity and has a problem that the discharge voltage is not high.

In this connection, it has been proposed to use $LiMnPO_4$ based on Mn that is an element higher in oxidation-reduction potential than Fe, for the positive electrode of a lithium ion battery. However, a phosphoric acid compound having the basic composition of $LiMnPO_4$ cannot easily realize redox generation of Mn. According to *Journal of the Electrochemical Society*, 144, 1188 (1997), among Mn-based phosphoric acid compounds, only $LiMn_xFe_{1-x}PO_4$ having a structure formed by substituting Fe for a part of Mn is an example where redox generation of Mn is possible.

Furthermore, an electrode active material based on an oligophosphate represented by the following formula has been also proposed (Kohyo (Japanese Unexamined Patent Publication) No. 2006-523930):

$$A_aM_bX_cO_{(3c+1)}$$

(wherein (a) A is at least one alkali metal and 0<a≤6; (b) M is at least one redox active element and 1≤b≤4; (c) X is selected from the group consisting of P, As, Sb, Si, Ge, V, S and a combination thereof; (d) 2≤c≤5; and A, M, X, a, b and c are selected so as to keep electrical neutrality of the compound). As specific examples, $Li_2FeP_2O_7$, $Na_2CoP_2O_7$, $Na_2NiP_2O_7$, $Na_2MnP_2O_7$, $Li_2Co_{0.5}Ni_{0.5}P_2O_7$, $Li_2MnP_2O_7$, $Li_2CoP_2O_7$, $Li_2NiP_2O_7$, $Na_2CuP_2O_7$, $Li_2VP_2O_7$, and $Li_{0.5}Na_{0.5}FeP_2O_7$ are disclosed.

According to the present inventors, when the amount of Fe is increased in $Li_2FeP_2O_7$, a high battery capacity may be obtained, but it is difficult to synthesize the compound without impurities.

RELATED ART

Patent Document

Patent Document 1: Kohyo No. 2006-523930

Non-Patent Document

Non-Patent Document 1: *Journal of the Electrochemical Society*, 144, 1188 (1997)

SUMMARY OF THE INVENTION

Problems to be Solved by the Invention

An object of the present invention is to solve these problems and provide a positive electrode active material containing a pyrophosphate compound, ensuring that mixing of impurities is easily prevented to facilitate the synthesis and a high battery capacity is obtained, and a lithium ion battery using the positive electrode material.

Means to Solve the Problems

In order to solve the problems above, the present invention provides the following inventions:

(1) a pyrophosphate compound represented by the formula: $Li_2M_{1-x}Fe_xP_2O_7$ (wherein M represents one or more elements selected from Mn, Zr, Mg, Co, Ni, V and Cu, and 0.3≤x≤0.9);

(2) the pyrophosphate compound as described in (1) above, wherein x is 0.7≤x≤0.9;

(3) the pyrophosphate compound as described in (1) or (2) above, wherein M is Mn;

(4) the pyrophosphate compound as described in any one of (1) to (3), having a low-temperature phase crystal structure or a high-temperature phase crystal structure;

(5) a production process for a pyrophosphate compound, comprising mixing starting materials of the pyrophosphate compound described in any one of (1) to (4) above, and firing the obtained raw material mixture at a temperature of 350 to 900° C.;

(6) the production process for a pyrophosphate compound as described in (5) above, wherein firing is performed at a temperature of 400 to 700° C.;

(7) a positive electrode active material containing the pyrophosphate compound described in any one of (1) to (4) above; and (8) a lithium ion battery using a positive electrode containing the positive electrode active material described in (7) above.

Effects of the Invention

According to the present invention, a positive electrode active material containing a pyrophosphate compound, ensuring that mixing of impurities is easily prevented to facilitate the synthesis and a high battery capacity is obtained, and a lithium ion battery using the positive electrode material, can be provided.

MODE FOR CARRYING OUT THE INVENTION

Figure 1:
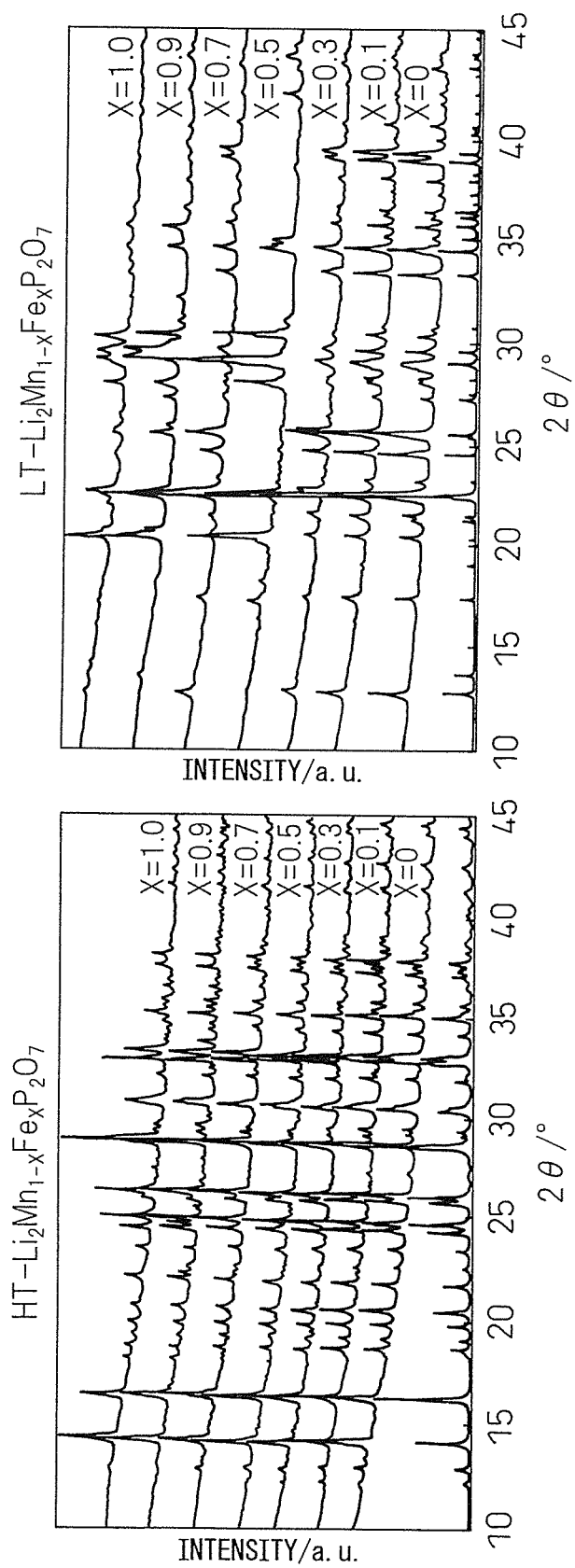
FIG. 1 shows the charge/discharge test results of $Li_2M_{1-x}Fe_xP_2O_7$ obtained in Examples and Comparative Examples.

The pyrophosphate compound of the present invention is represented by the formula: $Li_2M_{1-x}Fe_xP_2O_7$, wherein M represents one or more elements selected from Mn, Zr, Mg, Co, Ni, V and Cu, and $0.7 \leq x \leq 0.9$. That is, specific examples of the compound represented by $Li_2M_{1-x}Fe_xP_2O_7$ include $Li_2Mn_{1-x}Fe_xP_2O_7$, $Li_2(Mn,Zr)_{1-x}Fe_xP_2O_7$, $Li_2Mg_{1-x}Fe_xP_2O_7$, $Li_2Zr_{1-x}Fe_xP_2O_7$, $Li_2Ni_{1-x}Fe_xP_2O_7$, $Li_2Co_{1-x}Fe_xP_2O_7$, $Li_2V_{1-x}Fe_xP_2O_7$, $Li_2Cu_{1-x}Fe_xP_2O_7$, $Li_2(Mn,Co)_{1-x}Fe_xP_2O_7$, $Li_2(Co,Ni)_{1-x}Fe_xP_2O_7$, and $Li_2(Mn,Zr,Ni)_{1-x}Fe_xP_2O_7$. In view of stability, discharge capacity and the like, $Li_2Mn_{1-x}Fe_xP_2O_7$, $Li_2Ni_{1-x}Fe_xP_2O_7$ and $Li_2Co_{1-x}Fe_xP_2O_7$ are preferred, and $Li_2Mn_{1-x}Fe_xP_2O_7$ is most preferred. In these pyrophosphate compounds, in order to ensure that mixing of impurities is easily prevented to facilitate synthesis and a high battery capacity is obtained, x must $0.3 \leq x \leq 0.9$ and is preferably $0.5 \leq x \leq 0.9$, most preferably $0.7 \leq x \leq 0.9$. If x is less than 0.3, a high capacity battery is not obtained, whereas if x exceeds 0.9, a high capacity battery may be obtained, but the synthesis is difficult.

The BET specific surface area of the pyrophosphate compound is suitably 0.5 $m^2/g$ or more so that when the compound is used as a positive electrode active material, lithium can be smoothly diffused and a sufficient capacity can be obtained even under a large current. From this standpoint, the particle diameter is adjusted to be relatively small.

The pyrophosphate compound of the present invention is obtained by mixing starting materials of the pyrophosphate compound and firing the obtained raw material mixture at a temperature of 350 to 900° C., preferably from 400 to 700° C. If the firing temperature is less than 350° C., the starting material is not decomposed and the target compound cannot be obtained, whereas if the firing temperature exceeds 900° C., excessive grain growth may be caused.

Firing at a temperature of less than about 500° C. turns the later-described low-temperature phase into a crystal structure, and firing at about 500° C. or more turns a pyrophosphate compound having the later-described high-temperature phase into a crystal structure.

The starting material is not particularly limited, but suitable examples of the Li source include lithium carbonate ($Li_2CO_3$), suitable examples of the M source include manganese carbonate ($MnCO_3$), titania ($TiO_2$), magnesium oxalate ($MgC_2O_4 \cdot 2H_2O$), zinc oxide (ZnO) and cobalt oxalate ($CoC_2O_4 \cdot 2H_2O$), suitable examples of the Fe source include iron oxalate ($FeC_2O_4 \cdot 2H_2O$) and iron acetate ($Fe(CH_3COO)_2$), and suitable examples of the $P_2O_7$ source include ammonium dihydrogenphosphate ($NH_4H_2PO_4$).

For example, a compound containing a metal element M such as Mn, manganese carbonate ($MnCO_3$), ammonium dihydrogenphosphate ($NH_4H_2PO_4$) and lithium carbonate ($Li_2CO_3$ are uniformly mixed as starting materials in a predetermined ratio, and the mixture is fired by heating at a predetermined temperature in an inert gas atmosphere such as argon and nitrogen, whereby the pyrophosphate compound of the present invention is obtained.

The pyrophosphate compound of the present invention is suitable as a positive electrode active material, and a positive electrode containing this positive electrode active material is preferably used particularly for a lithium ion battery. The lithium ion battery is composed of positive and negative electrodes each containing an active material capable of reversible extraction/insertion of a lithium ion, and a nonaqueous electrolyte. For example, such a lithium ion battery comprises a negative electrode, a negative electrode can housing the negative electrode, a positive electrode, a positive electrode can housing the positive electrode, and a separator and an insulating gasket which are disposed between the positive electrode and the negative electrode, and a nonaqueous electrolytic solution is charged into the negative electrode can and the positive electrode can. The negative electrode is obtained by forming a negative electrode active material layer containing a negative electrode active material on a negative electrode current collector, and as the negative electrode current collector, for example, nickel foil or copper foil is used. As the negative electrode active material, a material capable of doping/dedoping lithium is used and specifically, for example, lithium metal, a lithium alloy, or an electrically conductive high-molecular or layered compound doped with lithium, is used. As the binder contained in the negative electrode active material layer, a resin material or the like known in this field can be used. The positive electrode is obtained by forming a positive electrode active material layer containing a positive electrode active material that is the pyrophosphate compound of the present invention, on a positive electrode current collector such as aluminum foil. As the binder contained in the positive electrode active material layer, a resin material or the like can be used.

The separator is used to separate the positive electrode from the negative electrode and, for example, a polymer film such as polypropylene is used. The thickness of the separator is preferably 50 μm or less.

The insulating gasket is integrally incorporated into the negative electrode can and is used to prevent leakage of the nonaqueous electrolytic solution charged into the negative electrode can and the positive electrode can.

As the nonaqueous electrolytic solution, a solution obtained by dissolving an electrolyte in an aprotic nonaqueous solvent is used. Examples of the nonaqueous solvent which can be used include propylene carbonate, ethylene carbonate, butylene carbonate, vinylene carbonate, γ-butyllactone, sulfolane, 1,2-dimethoxyethane, 1,2-diethoxyethane, 2-methyltetrahydrofuran, 3-methyl 1,3-dioxolane, methyl propionate, methyl butyrate, dimethyl carbonate, diethyl carbonate, and dipropyl carbonate. Above all, in view of voltage stability, cyclic carbonates such as propylene carbonate and vinylene carbonate, and chain carbonates such as dimethyl carbonate, diethyl carbonate and dipropyl carbonate are preferably used. As a nonaqueous solvent, one kind may be used alone, or two or more kinds may be mixed and used.

Examples of the electrolyte dissolved in the nonaqueous solvent, which can be used, include a lithium salt such as $LiPF_6$, $LiClO_4$, $LiAsF_6$, $LiBF_4$, $LiCF_3SO_3$ and $LiN(CF_3SO_2)_2$. Among these lithium salts, $LiPF_6$ and $LiBF_4$ are preferably used.

Assembling a lithium ion battery may be performed according to the conventional method, and the shape of the battery is also not limited and may be, for example, a cylinder, square, coin or button shape.

EXAMPLES

Examples 1 to 4 and Comparative Examples 1 to 3

Lithium carbonate ($Li_2CO_3$), manganese oxalate hydrate ($MnC_2O_4 \cdot 0.5H_2O$), iron oxalate hydrate ($FeC_2O_4 \cdot 2H_2O$) and ammonium hydrogenphosphate [$(NH_4)_2HPO_4$] were weighed to give $Li_2Mn_{1-x}Fe_xP_2O_7$ ($0 \leq x \leq 1$) in the stoichiometric ratio shown in Table 1 and wet-pulverized/mixed using acetone as the solvent in a ball mill at 240 rpm for 30 minutes and at 480 rpm for 2 hours. The slurry after mixing was dried under reduced pressure at room temperature to obtain a precursor, and in an Ar atmosphere, this precursor was fired at 600° C. for 6 hours to obtain high-temperature phase HT-$Li_2Mn_{1-x}Fe_xP_2O_7$ ($0 \leq x \leq 1$) and fired at 450° C. for 24 hours to obtain low-temperature phase LT-$Li_2Mn_{1-x}Fe_xP_2O_7$ ($0 \leq x \leq 1$).

(Structural Analysis)

As the radiation source of the powder X-ray diffraction measurement, CuKα was used. Structural analysis of product, identification of impurity, and confirmation of the presence or absence of decomposition were performed by the Rietveld/Pawley analysis.

(Electrochemical Measurement)

An electrode using HT-$Li_2Mn_{1-x}Fe_xP_2O_7$ ($0 \leq x \leq 1$) as the active material was produced by the following procedure.

Materials according to the formulation of active material: acetylene black (electrically conductive additive):polyvinylidene fluoride (binding material)=80:20:2 (by weight) were thoroughly mixed in a mortar, and the mixture was coated on an Al foil and dried under reduced pressure by heating at 120° C. for 30 minutes. This HT-$Li_2Mn_{1-x}Fe_xP_2O_7$ was used as the electrode, and the charge-discharge test was performed in a 2032-type coil cell using the electrode as the positive electrode and using Li metal as the counter electrode. The electrolyte was 1 M $LiPF_6$/EC+DEC, and porous CellGuard was used for the separator. Cell assembling was all performed in a glove box in an Ar atmosphere. In the charge/discharge test, the cutoff was set at 2.0 to 4.5 V vs. Li/Li$^+$, and charging in CCCV mode and discharging in CC mode were performed. At this time, the rate was C/20 for both charging and discharging, and the measurement temperature was 25° C.

(Results)

FIG. 1 shows the obtained powder X-ray diffraction results. It is seen that in the high-temperature phase, a single phase is formed irrespective of the composition. This well agrees with the structure recently reported by Adam et al. [*J. Solid State Chem.*, 181 (11), 3110 (2008)].

The XRD pattern of the low-temperature phase was found to be a novel pattern different from that of the high-temperature phase. Details thereof are shown in Table 2.

TABLE 1

| | | $Li_2CO_3$ | $MnC_2O_4 \cdot 0.5H_2O$ | $FeC_2O_4 \cdot 2H_2O$ | $(NH_4)_2HPO_4$ |
|---|---|---|---|---|---|
| Comparative Example 1 | $Li_2MnP_2O_7$ | 1.5219 g | 3.1300 g | — | 5.4400 g |
| Comparative Example 2 | $Li_2Mn_{0.9}Fe_{0.1}P_2O_7$ | 1.5213 g | 2.8159 g | 0.3704 g | 5.4379 g |
| Example 1 | $Li_2Mn_{0.7}Fe_{0.3}P_2O_7$ | 1.5202 g | 2.1885 g | 1.1103 g | 5.4339 g |
| Example 2 | $Li_2Mn_{0.5}Fe_{0.5}P_2O_7$ | 1.5191 g | 1.5621 g | 1.8492 g | 5.4298 g |
| Example 3 | $Li_2Mn_{0.3}Fe_{0.7}P_2O_7$ | 1.5179 g | 0.9365 g | 2.5869 g | 5.4257 g |
| Example 4 | $Li_2Mn_{0.1}Fe_{0.9}P_2O_7$ | 1.5168 g | 0.3119 g | 3.3236 g | 5.4217 g |
| Comparative Example 3 | $Li_2FeP_2O_7$ | 1.5162 g | — | 3.6915 g | 5.4197 g |

TABLE 2

| Atom | Wyckoff | x | y | z | Occupancy | $B_{iso}/Å^2$ |
|---|---|---|---|---|---|---|
| Mn1 | 2a | 0.8898 (11) | -0.193 (3) | 0.5251 (17) | 1.0 | 1.00 (5) |
| Mn2 | 2a | 0.3909 (11) | 0.049 (3) | 0.0170 (17) | 1.0 | =Mn1 |
| P1 | 2a | 0.0272 (3) | 0.157 (3) | 0.986 (3) | 1.0 | 0.71 (6) |
| P2 | 2a | 0.2934 (16) | -0.130 (3) | 0.5784 (19) | 1.0 | =P1 |
| P3 | 2a | 0.4722 (17) | 0.214 (3) | 0.512 (3) | 1.0 | =P1 |
| P4 | 2a | 0.7904 (14) | -0.011 (3) | 1.0467 (19) | 1.0 | =P1 |
| O1 | 2a | 0.232 (3) | 0.415 (3) | 0.184 (5) | 1.0 | 0.55 (7) |
| O2 | 2a | 0.836 (2) | 0.101 (3) | 0.978 (4) | 1.0 | =O1 |
| O3 | 2a | 0.128 (3) | -0.151 (3) | 0.697 (5) | 1.0 | =O1 |
| O4 | 2a | 0.365 (3) | 0.282 (3) | 0.633 (4) | 1.0 | =O1 |
| O5 | 2a | 0.925 (3) | -0.049 (3) | 0.286 (4) | 1.0 | =O1 |
| O6 | 2a | 0.144 (3) | 0.072 (3) | 0.844 (4) | 1.0 | =O1 |
| O7 | 2a | 0.425 (3) | -0.095 (4) | 0.755 (4) | 1.0 | =O1 |
| O8 | 2a | 0.493 (3) | 0.110 (3) | 0.661 (6) | 1.0 | =O1 |
| O9 | 2a | 0.367 (4) | 0.497 (3) | 0.826 (5) | 1.0 | =O1 |
| O10 | 2a | 0.068 (3) | 0.161 (3) | 0.271 (4) | 1.0 | =O1 |
| O11 | 2a | 0.281 (3) | -0.062 (3) | 0.312 (5) | 1.0 | =O1 |
| O12 | 2a | 0.008 (4) | 0.254 (3) | 0.838 (6) | 1.0 | =O1 |
| O13 | 2a | 0.571 (3) | 0.693 (3) | 0.800 (4) | 1.0 | =O1 |
| O14 | 2a | 0.359 (2) | 0.759 (3) | 0.437 (4) | 1.0 | =O1 |
| Li1 | 2a | 0.389 | 0.312 | 0.014 | 1.0 | 1.0 |
| Li2 | 2a | 0.917 | 0.387 | 0.922 | 1.0 | 1.0 |
| Li3 | 2a | 0.934 | 0.528 | 0.513 | 1.0 | 1.0 |
| Li4 | 2a | 0.389 | 0.484 | 0.472 | 1.0 | 1.0 |

Space group:
P2$_1$, a = 8.25641(12) Å, b = 12.9582(2) Å, c = 4.98361(8) Å, β = 92.8443(12)°
R$_{wp}$ = 7.763%, R$_p$ = 5.456%, gof = R$_{wp}$/R$_{exp}$ = 1.132, R$_{Bragg}$ = 1.215%

Both Mn1 and Mn2 have a six-coordinated octahedral structure, and both Li and P have a four-coordinated tetrahedral structure. Two P sites form $P_2O_7^{4-}$ by sharing the apex of the tetrahedron. The impurities contained in the low-temperature phase are $Li_4P_2O_7$ (P2$_1$/n) and $Mn_2P_2O_7$ (C2/m).

Figure 2:
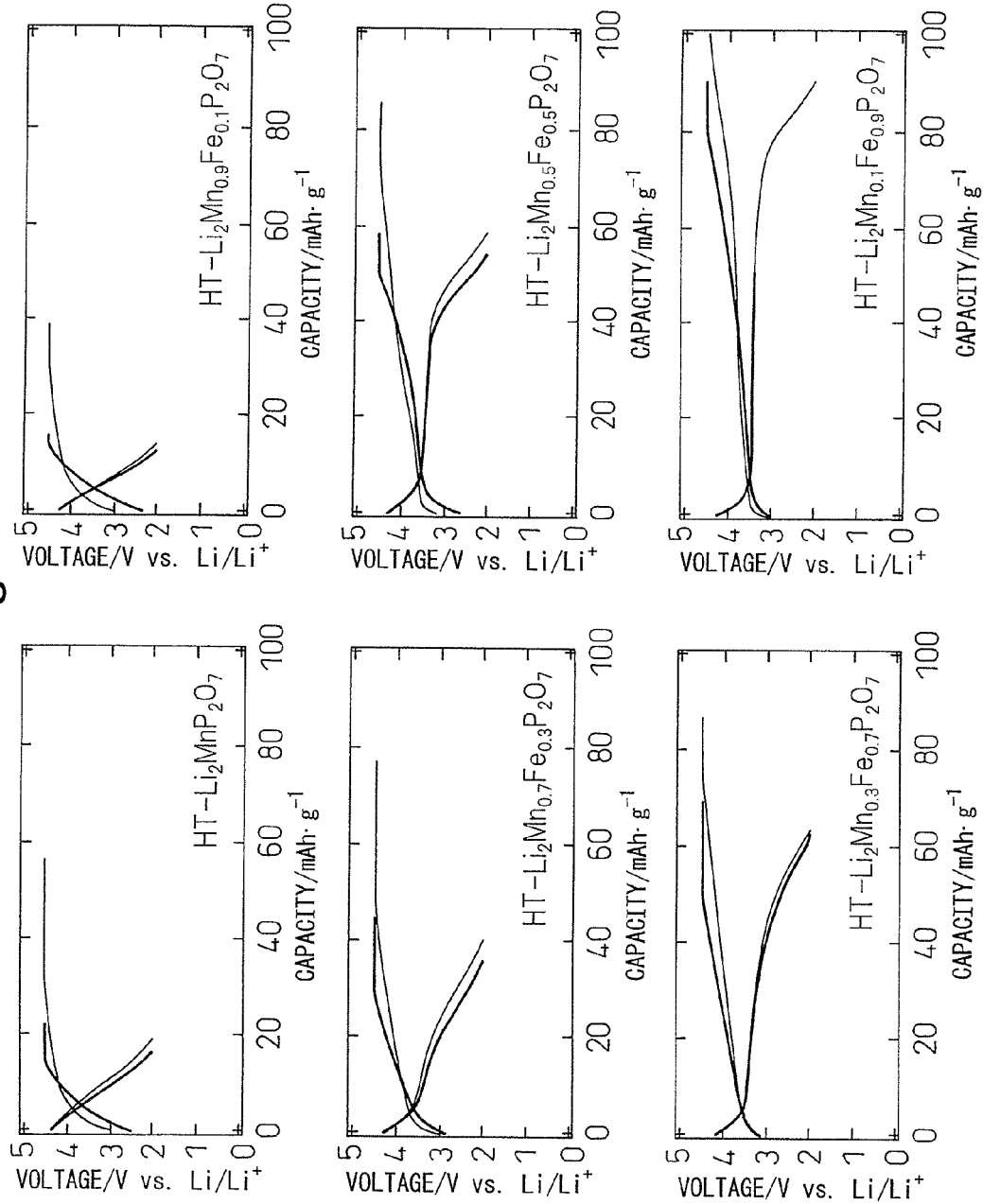
FIG. 2 shows the charge/discharge test results of $Li_2M_{1-x}Fe_xP_2O_7$ obtained in Examples and Comparative Examples.

FIG. 2 shows the results of respective charge/discharge tests for different formulations with respect to Mn and Fe. As the Mn amount decreases and the Fe amount increases, a flat potential region is observed and the discharge capacity is also enhanced. While the theoretical capacity is 220 mAh/g, the discharge capacity actually obtained is: when x=0, initial discharge capacity: 19.2 mAh/g and discharge capacity at fifth cycle: 16.7 mAh/g; when x=0.1, initial discharge capacity: 13.7 mAh/g and discharge capacity at fifth cycle: 12.5 mAh/g; when x=0.3, initial discharge capacity: 40.0 mAh/g and discharge capacity at firth cycle: 36.0 mAh/g; when x=0.5, initial discharge capacity: 58.6 mAh/g and discharge capacity at fifth cycle: 54.2 mAh/g; when x=0.7, initial discharge capacity: 63.4 mAh/g and discharge capacity at fifth cycle: 62.1 mAh/g; and when x=0.9, initial discharge capacity: 90.2 mAh/g and discharge capacity at fifth cycle: 88.2 mAh/g.

Figure 3:
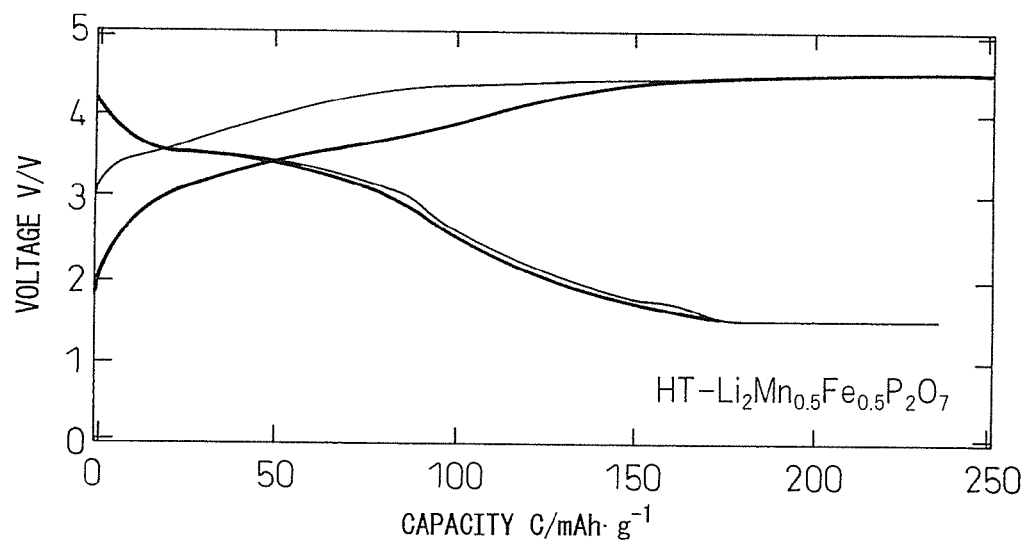
FIG. 3 shows the powder X-ray diffraction diagrams of $Li_2M_{0.5}Fe_{0.5}P_2O_7$ obtained in Examples and Comparative Examples.
Figure 4:
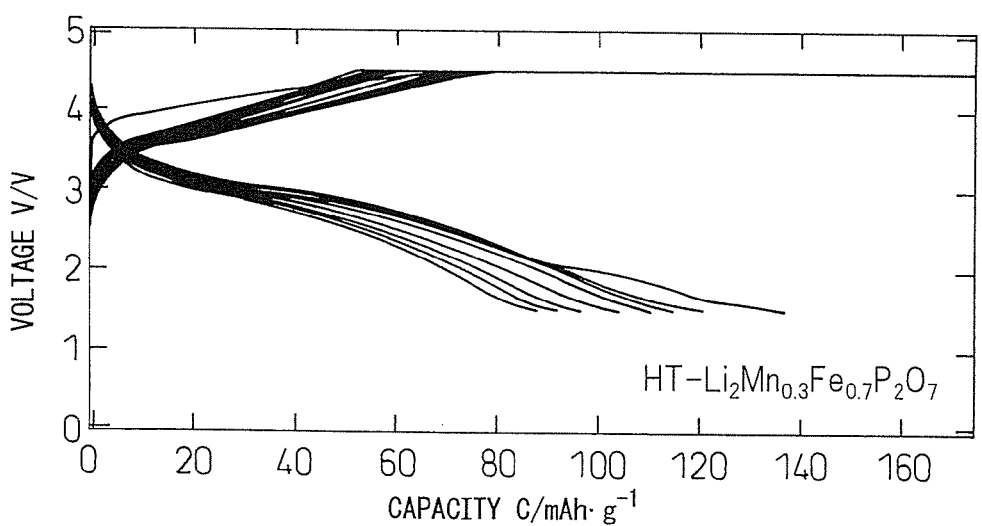
FIG. 4 shows the charge/discharge test results of $Li_2Mn_{0.3}Fe_{0.7}P_2O_7$ obtained in Examples and Comparative Examples.

Furthermore, in the electrochemical measurement above, the charge/discharge test was performed for HT-$Li_2Mn_{0.5}Fe_{0.5}P_2O_7$ and HT-$Li_2Mn_{0.3}Fe_{0.7}P_2O_7$ by changing the measurement temperature to 60° C. from 25° C. FIGS. 3 and 4 show the results. It is seen that in both cases, remarkably enhanced charge/discharge characteristics are exhibited.

According to the present invention, when 0.3≤x≤0.9, preferably 0.7≤x≤0.9, a pyrophosphate compound ensuring easy synthesis and a high battery capacity can be obtained, and this pyrophosphate compound exhibits excellent repetitive charge/discharge characteristics thanks to an electron-accepting reaction utilizing oxidation and reduction of Fe.

INDUSTRIAL APPLICABILITY

According to the present invention, a positive electrode active material containing a pyrophosphate compound, ensuring that mixing of impurities is easily prevented to facilitate the synthesis and a high battery capacity is obtained, and a lithium ion battery using the positive electrode material, can be provided.

The invention claimed is:

1. A pyrophosphate compound represented by the formula:

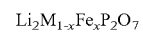

$Li_2M_{1-x}Fe_xP_2O_7$ (wherein M represents one or more elements selected from Mn, Zr, Mg, Co, Ni, V and Cu, and 0.3≤x≤0.9).

2. The pyrophosphate compound as claimed in claim 1, wherein x is 0.7≤x≤0.9.

3. The pyrophosphate compound as claimed in claim 1, wherein M is Mn.

4. The pyrophosphate compound as claimed in claim 1, having a low-temperature phase crystal structure or a high-temperature phase crystal structure.

5. A production process for a pyrophosphate compound, comprising mixing starting materials of the pyrophosphate compound claimed in claim 1, and firing the obtained raw material mixture at a temperature of 350 to 900° C.

6. The production process for a pyrophosphate compound as claimed in claim 5, wherein firing is performed at a temperature of 400 to 700° C.

7. A positive electrode active material containing the pyrophosphate compound claimed in claim 1.

8. A lithium ion battery using a positive electrode containing the positive electrode active material claimed in claim 7.

* * * * *